(12) United States Patent
Proffitt et al.

(10) Patent No.: US 6,264,110 B1
(45) Date of Patent: Jul. 24, 2001

(54) SETBACK REPORTING THERMOSTAT

(75) Inventors: Jerry L. Proffitt, Wabash, IN (US); Raymond J. Archacki, Jr., Wethersfield, CT (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 09/594,974

(22) Filed: Jun. 15, 2000

(51) Int. Cl.[7] .............................. G05D 23/00; F23N 5/20
(52) U.S. Cl. ............................. 236/46 R; 236/47; 236/94; 165/11.1
(58) Field of Search ................................. 236/41, 46 R, 236/51, 94; 165/11.1

(56) References Cited

U.S. PATENT DOCUMENTS 5,819,840 * 10/1998 Wilson et al. ..................... 236/47 X

FOREIGN PATENT DOCUMENTS

000341022 * 11/1989 (EP) ........................................ 236/47

* cited by examiner

Primary Examiner—William Wayner

(57) ABSTRACT

A thermostat receives requests to enter into setback modes of operation whereby at least one set point normally used by the thermostat is changed. The thermostat is operative to compute the time that elapses during each setback mode of operation. The thermostat is also operative to maintain a running total of such computed times in order to respond to any request for the total accumulated time that has elapsed in the setback modes of operation. This includes computing, if necessary, the amount of time that has elapsed in a setback mode of operation occurring during a request for the total accumulated time. The thermostat is furthermore operative to set the total accumulated time to zero in response to a request to initialize the total accumulated time.

12 Claims, 5 Drawing Sheets

SETBACK REPORTING THERMOSTAT

BACKGROUND OF THE INVENTION

The present invention relates to thermostats having the capability of tracking, recording, and reporting setback information to a remotely located entity.

Thermostats have heretofore received and implemented setbacks of locally programmed setpoints in response to receiving setback information from a remotely located source such as an energy provider. An example of such a thermostat is disclosed in commonly assigned U.S. patent application Ser. No. 09/456,355 entitled "Communicating Thermostat". The aforementioned thermostat includes an ability within the thermostat to override a request by the energy provider to adjust the locally programmed setpoints. When this occurs, a communication is generated to the energy provider informing the energy provider that an override has occurred.

The above described thermostat requires that the energy provider must keep track of when such overrides occur so as to maintain an accurate record of the amount of time the thermostat has participated in a requested adjustment of the locally programmed setpoints. This can pose particular problems for an energy provider who might need to receive and process such overrides from quite a few communicating thermostats possibly at or near the same time. The energy provider must also make sure that the record or database it maintains of such override information is preserved since there is no ability to further query the individual thermostats as to their respective participation in requested setbacks or curtailments of locally programmed setpoints.

SUMMARY OF THE INVENTION

It is an object of this invention to provide a thermostat that allows a remotely located source such as an energy provider to determine when the latter wishes to receive override information from the thermostat relative to participation in requested setbacks or adjustments of setpoints.

The above and other objects are achieved by a thermostat which maintains a record of the elapsed time in any presently occurring setback mode of operation being implemented by the thermostat as well as the elapsed times in any setback modes of operation previously implemented by the thermostat. The record of the presently occurring mode of setback operation as well as any previous setback modes of operation is stored for retrieval by a remotely located entity, which is usually an energy provider seeking an accurate record of time spent in setback modes of operation by the thermostat. This time record is available for retrieval at any time, including a time when the thermostat is presently in a setback mode of operation. The thermostat also preferably allows the requester to clear the accumulated time record or simply read the time record without clearing. In either case, the thermostat preferably continues to track any time during which the thermostat is in a current setback mode of operation. This includes the tracking of any remaining time in a current setback mode of operation when the accumulated time record is cleared.

BRIEF DESCRIPTION OF THE DRAWINGS

For a fuller understanding of the present invention, reference should now be made to the following detailed description taken in conjunction with the accompanying drawings, wherein.

DESCRIPTION OF THE PREFERRED EMBODIMENTS

Figure 1:
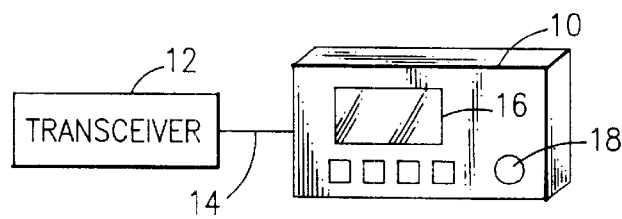
FIG. 1 is a block diagram of a thermostat and transceiver, wherein the transceiver is in communication with a remotely located device (not shown) so as to thereby receive and/or transmit information to the remotely located device.

Referring to FIG. 1, a thermostat 10 is operatively connected to a transceiver 12 via a communication line 14 so as to receive or transmit information to the transceiver 12. A transceiver 12 in turn is in communication with a remotely located device (not shown). The transceiver 12 provides a communication link between the thermostat 10 and a remotely located device (not shown), which provides set point control information to the thermostat 10. The remotely located device is preferably controlled by an energy provider seeking to provide cost effective set point control information to the thermostat 10.

The thermostat preferably causes messages to be displayed on a display 16 in response to receipt of information from the remotely located device that is preferably controlled by an energy provider. This includes the display of a message that the thermostat is in a setback mode of operation wherein the locally entered set point has been adjusted or altered in response to a request from the remotely located device preferably controlled by an energy provider. A touch sensitive button 18 on the front panel of the thermostat can be depressed any time one wishes to override the setback mode of operation.

Figure 2:
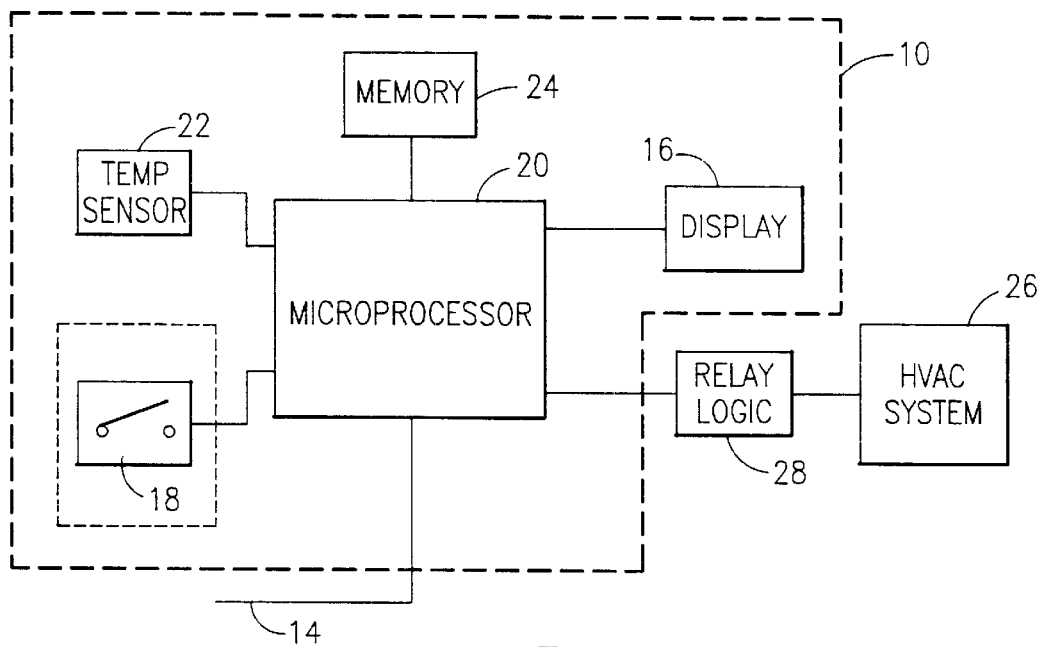
FIG. 2 is a block diagram of elements within the thermostat including a microprocessor that is responsive to signals from the transceiver.

Referring to FIG. 2, the touch-sensitive button 18 is illustrated as a switch connected to a microprocessor 20 which is in turn connected to the display 16. The microprocessor 20 is also connected to a temperature sensor 22 and a memory 24. The microprocessor normally executes one or more control programs stored in memory 24, which monitor any variation of the temperature indicated by the sensor 22 with respect to one or more locally entered setpoints preferably stored in the memory 24. These control programs cause the microprocessor to control an HVAC system 26 through relay logic 28 so as to thereby heat or cool the space in which the thermostat is located as necessary.

The microprocessor 20 also executes a program stored in memory 24, which processes information received from the transceiver 12 via the line 14. This latter program, when executed by the microprocessor, will preferably implement adjustments to the locally entered setpoints that have been stored in the memory 24. It is, however, to be noted that this program may simply replace the locally entered setpoints without departing from the invention. The microprocessor will thereafter execute the one or more control programs stored in the memory 24 so as to monitor any variation of the temperature indicated by the temperature sensor 22 with respect to the now modified setpoints. The program will furthermore cause the microprocessor to track and maintain an accurate record of the amount of time during which the thermostat remains in this setback or curtailment mode of operation. The program processor will moreover maintain any record of any past setback or curtailment modes of operation so as to thereby provide an accurate record of setback usage upon receipt of a request from the energy provider.

Figure 3A:
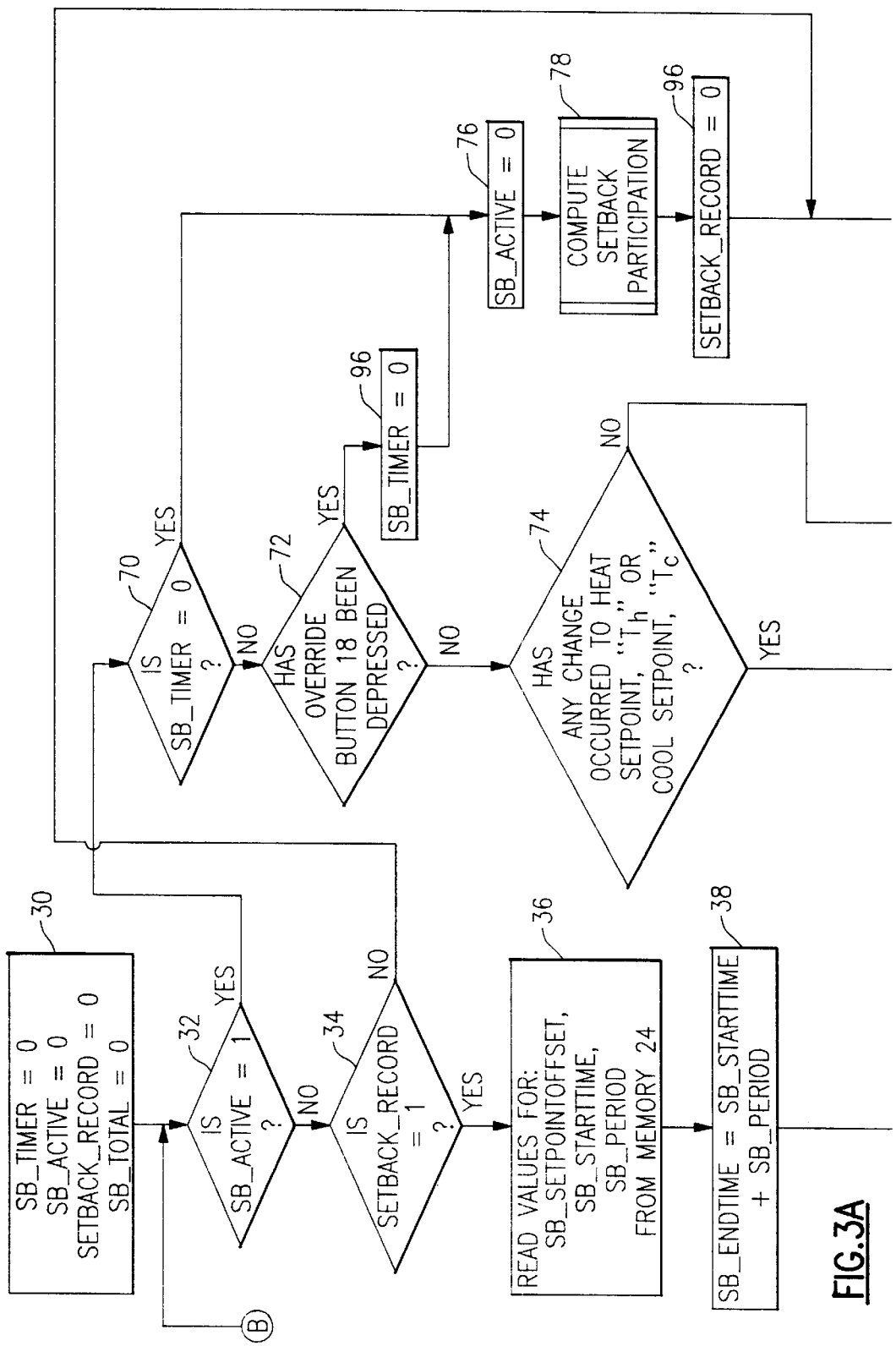
FIGS. 3A, 3B and 3C are a flowchart of the program implemented by the processor of FIG. 2 so as to respond to communications from the transceiver.
Figure 3B:
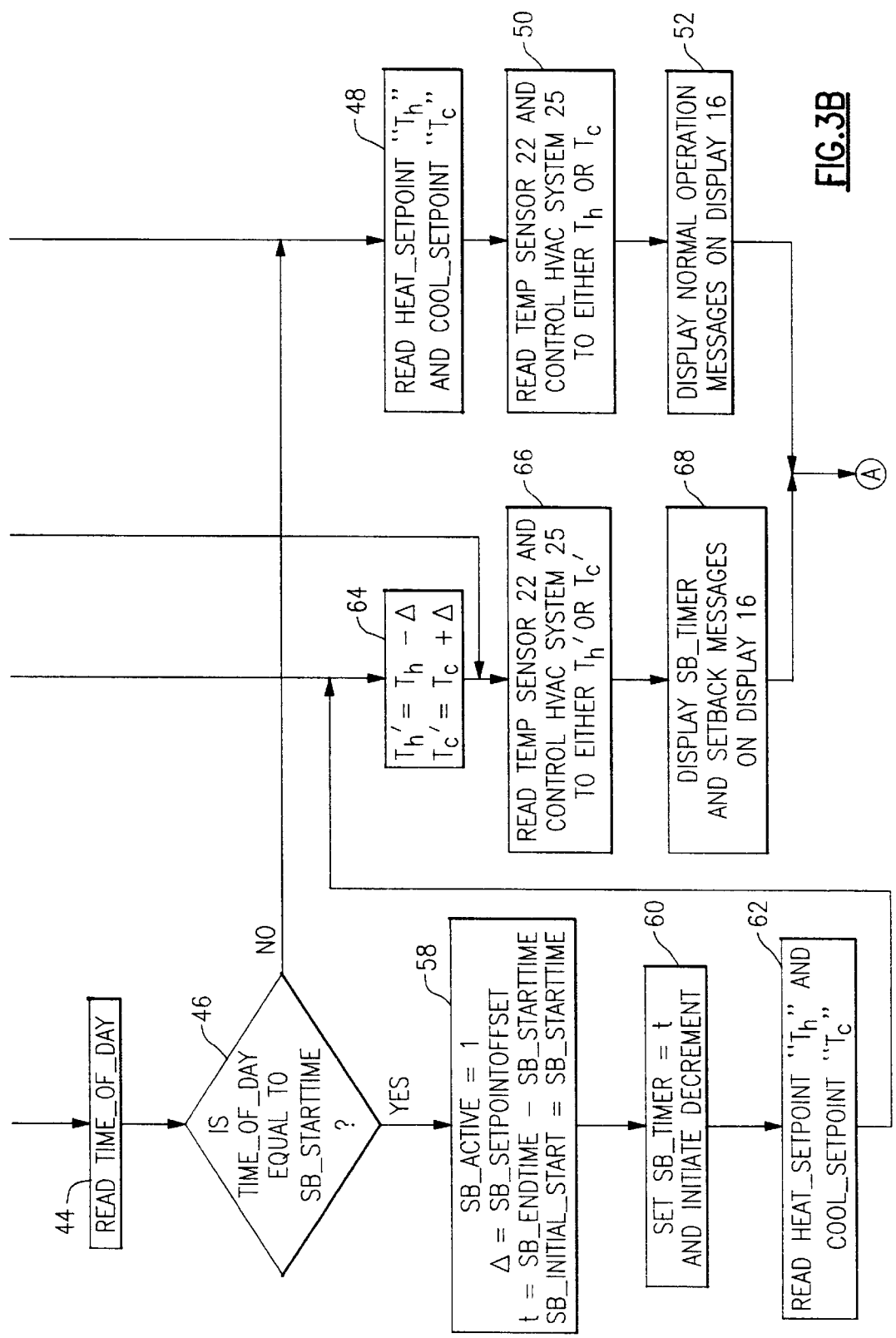
Figure 3C:
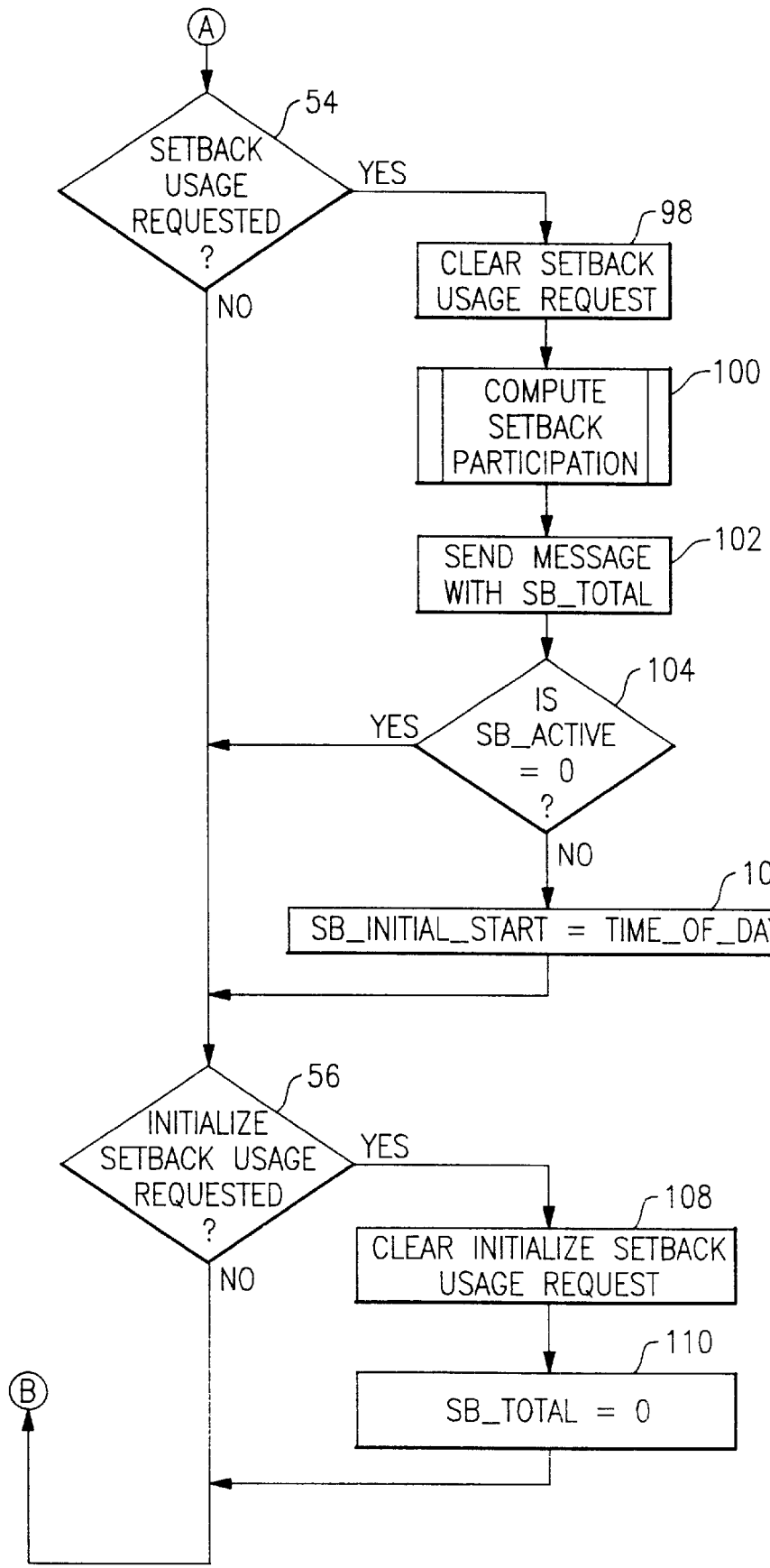

Referring to FIGS. 3A, 3B and 3C, a flowchart of the steps executed by the microprocessor 20 in response to receipt of information concerning setback or curtailment of locally entered setpoints is illustrated. As has been previously discussed, the microprocessor will receive this information from the transceiver 12 via the line 14. The flowchart begins with a step 30 wherein certain variables used by the program are initialized. These include SB_TIMER, SB_ACTIVE, SETBACK_RECORD and SB_TOTAL. The microprocessor proceeds from a step 30 to a step 32 and inquires as to whether SB_ACTIVE is equal to one. Since this variable will have been initially set equal to zero, the microprocessor would proceed to a step 34 and inquire as to whether the SETBACK_RECORD equals zero. It is to be appreciated that the microprocessor 20 will independently of the program illustrated in FIG. 3, respond to a communication passed along by the transceiver 12 regarding any setback of the setpoint that may be requested by the energy provider. SETBACK_RECORD will be set equal to one when this occurs. The processor will furthermore store information pertaining to the requested setback in the memory 24. This information will preferably include values for the following variables: SB_SETPOINTOFFSET, SB_STARTTIME, and SB_PERIOD.

SB_SETPOINTOFFSET is the amount by which the locally setpoints are to be adjusted whereas SB_STARTTIME is the preferred time in which the setback of the setpoints is to begin. SB_PERIOD is the amount of time during which the particular setback mode of operation is to occur. Assuming a setback request has been received and stored in the memory, the processor will proceed along a yes path to a step 36 and store the values for SB_SETPOINTOFFSET, SB_STARTTIME and SB_PERIOD. The processor will proceed to a step 38 and compute the value of SB_ENDTIME, which is the sum of SB_STARTTIME plus SB_PERIOD.

The processor will proceed from step 38 to a step 44 and read the "TIME_OF_DAY". This is preferably read from an internal system clock within the microprocessor, which tracks time by at least the total number of minutes in a twenty-four hour day. The processor proceeds from step 44 to step 46 and inquires as to whether the TIME_OF_DAY read in step 44 is equal to SB_STARTTIME.

Assuming that the time of day is not equal to SB_STARTTIME, the processor will proceed along a no path out of step 46 to a step 48 and read the currently stored values of heat setpoint, $T_h$ and cool setpoint, $T_c$. The microprocessor will thereafter proceed to step 50 and read the temperature sensor 22 and thereafter control the HVAC system 26 to either $T_h$ or $T_c$. It is to be appreciated that such control is defined by a separate control program, which reads the temperature sensor 22 and thereafter controls the HVAC system 26 so as to either achieve the heat setpoint $T_h$ or the cool setpoint $T_c$. It is to be appreciated that the setpoint which is used will depend on the HVAC system. If the HVAC system is, for example, a reversible heat pump, then the mode of operation of the heat pump will determine whether $T_h$ or $T_c$ is used. The processor will proceed to step 52 and display a message on the display 16 that the thermostat is in a "normal" mode of operation. The processor will proceed from step 52 through a junction A to a step 54 and inquire as to whether or not a request has been received for a report on setback usage by the thermostat. It is to be understood that such a request would normally be initiated by the energy provider and stored in the memory 24 for inquiry by the microprocessor in step 54. Assuming that no such setback usage has occurred, the processor will proceed along the no path to a step 56 and inquire as to whether a communication has been received from the energy provider requesting that setback usage be initialized. Assuming that such an initialization has not been requested, the processor will proceed along the no path to junction B and return to step 32.

Since the value of SB_ACTIVE is still zero, the processor will proceed through steps 34–46, as has been previously discussed. Assuming that the read time of day in step 44 now equals SB_STARTTIME, the processor will proceed along the yes path out of step 46 to a step 58. Referring to step 58, the processor will first set the variable SB_ACTIVE equal to one. The processor will also set a variable Δ equal to SB_SETPOINTOFFSET. The microprocessor will still furthermore compute the value of a variable "t" as being equal to SB_ENDTIME minus SB_STARTTIME. The processor may again need to account for any transition between one day and the next when doing this computation. In this regard, SB_ENDTIME would need to be adjusted by the total time in one day in the event that SB_STARTTIME is near the end of one day and SB_ENDTIME occurs the next day.

The final computation within step 58 is to set SB_INITIAL_START equal to SB_STARTTIME. The processor will proceed to step 60 and set a software timer SB_TIMER equal to "t" and initiate a decrementing of the software timer. The processor will next proceed from step 60 to a step 62 and read the locally entered setpoints $T_h$ and $T_c$ from memory 24. The processor will next proceed to a step 64 and adjust the values of $T_h$ and $T_c$ by the value of Δ. This will effectively lower the heat setpoint $T_h$ by the amount of Δ and raise the cool setpoint $T_c$ by the amount Δ. The processor will proceed to step 66 and read the temperature sensor 22 and control the HVAC system 26 in accordance with either $T'_h$ or $T'_c$ as computed in step 64. In this manner, the HVAC control system will now be controlling the HVAC system to a lower heat setpoint or to a higher cool setpoint so as to thereby produce an incremental savings of energy costs. The processor will proceed to a step 68 and display the current value of SB_TIMER and a message indicating that the thermostat is in a curtailment or setback mode of operation. The processor will proceed through steps 54 and 56 in the event that neither setback usage or an initialization of setback usage have been requested by the energy provider.

The processor will again return to step 32 and inquire as to whether SB_ACTIVE is equal to one. Since SB_ACTIVE will have been set equal to one in step 58, the processor will proceed along the yes path to a step 70 and inquire as to whether the software time, SB_TIMER, has been decremented to zero. Assuming that the SB_TIMER is not equal to zero, the processor will proceed to a step 72 and inquire as to whether the override button 18 has been depressed. Assuming that the override button 18 has not been depressed, the processor will proceed to a step 74 and inquire as whether either the locally entered heat setpoint "$T_h$" or the locally entered cool setpoint "$T_c$" has changed between successive executions of the logic of FIG. 3. This is preferably accomplished by comparing the time of day with any user programmed setpoint change times in memory 24. If the time of day is within a very small predefined range of a programmed setpoint change time in memory 24, then the values of the new locally entered setpoints for the particular change time are read and stored as $T_h$ and $T_c$. The processor will then proceed to step 64 and adjust the new locally entered setpoints $T'_h$ and $T'_c$.

The processor will proceed either from step 74 or step 64 to step 66 and implement the control of the HVAC system 26, as has been previously described. The display will be updated in accordance with step 68 before proceeding through steps 54 and 56 in the event that setback usage has not been requested.

Referring again to step 32, the processor will again inquire as to whether SB_ACTIVE is equal to one. Since the thermostat is in a setback mode of operation, the processor will again proceed to step 70 and inquire as to whether the SB_TIMER equals zero. Assuming that SB_TIMER has now been decremented to zero, the processor will proceed along the yes path to a step 76 and set SB_ACTIVE equal to zero. The processor will proceed to a step 78 and initiate a sub-routine entitled "COMPUTE_SETBACK_PARTICIPATION". This particular sub-routine is illustrated in FIG. 4.

Figure 4:
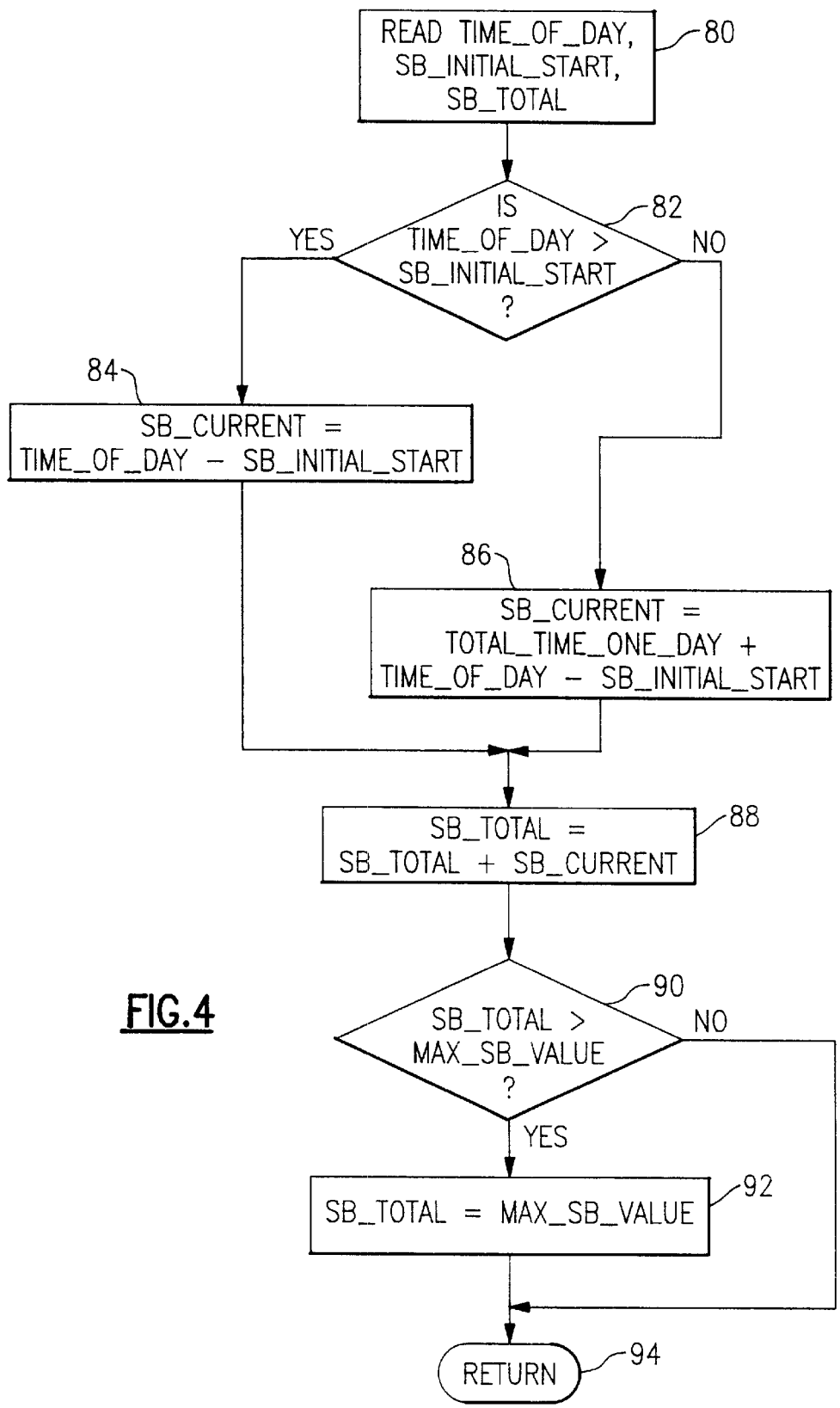
FIG. 4 is a flowchart of a sub-routine within the program of FIGS. 3A, 3B and 3C.

Referring to FIG. 4, the COMPUTE_SETBACK_PARTICIPATION sub-routine begins with a step 80 wherein the current time of day is read as well as the value of the variables SB_INITIAL_START and SB_TOTAL. It will be remembered that the value of SB_INITIAL_START will have been computed in step 58 to be equal to the TIME_OF_DAY read in step 44 when the thermostat enters a setback mode of operation. SB_TOTAL, on the other hand, will initially be equal to zero as required in step 30.

The processor proceeds from step 80 to a step 82 and inquires as to whether the currently read TIME_OF_DAY is greater than SB_INITIAL_START. In the event that the currently read TIME_OF_DAY is greater than SB_INITIAL_START, the processor will proceed along the yes path to a step 84 and compute the value of a variable denoted as SB_CURRENT. Referring to step 84, SB_CURRENT is equal to the TIME_OF_DAY as read in step 80 minus the value of SB_INITIAL_START. It is to be appreciated that this computation should yield the current amount of setback time that has expired since SB_ACTIVE was set equal to one in step 58. Referring again to step 82, in the event that the TIME_OF_DAY is not greater than SB_INITIAL_START, then the processor will proceed along the no path and compute the value of the SB_CURRENT variable in another manner. Specifically, SB_CURRENT will be equal to the value of TOTAL_TIME_ONE_DAY plus TIME_OF_DAY minus SB_INITIAL_START. In this regard, the value of the variable TOTAL_TIME_ONE_DAY is the total amount of time in a given day expressed in terms of total number of minutes in the day or whatever unit of time is used in the particular embodiment. It is to be appreciated that the computation of SB_CURRENT in step 86 is necessary in the event that a transition has occurred from one day to the next following the time indicated by SB_INITIAL_START.

Referring now to step 88, the value of the variable SB_TOTAL is computed as a function of the determined value of SB_CURRENT out of either steps 84 or 86. SB_TOTAL is seen to be equal to the sum of any previous value of SB_TOTAL plus the value of SB_CURRENT. Since SB_TOTAL was initially set equal to zero in step 30, the value of SB_TOTAL, as first computed in step 88, should merely be the value of SB_CURRENT. It is, however, to be understood that if there have been previous setback modes of operation of the thermostat, then the value of SB_TOTAL out of step 88 will be equal to the previously determined SB_TOTAL plus SB_CURRENT. The processor proceeds from the computation of SB_TOTAL in step 88 to step 90 wherein inquiry is made as to whether SB_TOTAL is greater than MAX_SB_VALUE. MAX_SB_VALUE is preferably a value set by the energy provider as the maximum setback usage amount that may be claimed by the user of the thermostat during any one particular billing. This value may be hard coded into the software or it may be transmitted to the thermostat at any point in time and stored in the memory 24 for use when step 90 is encountered. In the event that the SB_TOTAL exceeds MAX_SB_VALUE, the processor proceeds to step 92 and sets SB_TOTAL equal to MAX_SB_VALUE. Otherwise, the microprocessor proceeds along the no path out of step 90 to return step 94. The processor proceeds out of the sub-routine of FIG. 4 back to step 78 wherein the processor proceeds to step 96 and sets SETBACK_RECORD equal to zero.

The processor proceeds from step 96 to step 48 wherein the locally programmed setpoints $T_h$ and $T_c$ are read before proceeding to step 50 to control the HVAC system in accordance with the appropriate locally entered setpoint $T_h$ or $T_c$. In this regard, the processor will have left the setback mode of operation and will now be using normal local unit setpoints to control the HVAC system. The processor will proceed through steps 52, 54, and 56, as has been previously described, before returning to step 32. Since SB_ACTIVE will have been previously set equal to zero in step 76, the processor will proceed along the no path out of step 32 to inquire as to whether SETBACK_RECORD equals one. If it does not, the microprocessor will proceed along the no path to step 48 and again execute steps 48–56, as has been previously described.

Referring again to step 34, in the event that SETBACK_RECORD is equal to one at some point, then the processor will again read the values of SB_SETPOINTOFFSET, SB_STARTTIME, and SB_PERIOD from the memory 24 in step 36. The processor will next proceed through steps 36–46 to determine whether the current TIME_OF_DAY is equal to SB_STARTTIME. Assuming that at some point TIME_OF_DAY is equal to SB_STARTTIME, the processor will proceed through steps 58–68 and hence through 54–56 as has been previously discussed. The processor will, on the next execution of the logic of FIG. 3, proceed back through step 32 and now exit along the yes path to step 70. Assuming that the SB_TIMER is not equal to zero, the processor will proceed to a step 72 and inquire whether the override button 18 has been depressed. It will be remembered that the override button 18 will have been depressed in the event that the user wishes to override the setback mode of operation, as displayed on the display 16. If this occurs, the processor will proceed along the yes path out of step 72 and set SB_TIMER equal to zero in a step 96. The processor will proceed to set SB_ACTIVE equal to zero in step 76 before proceeding in step 78 to the sub-routine for computing setback participation of FIG. 4.

Referring to FIG. 4, the current TIME_OF_DAY as well as the values of SB_INITIAL_START and SB_TOTAL will be read in step 80. Inquiry will next be made as to whether the TIME_OF_DAY is greater than SB_INITIAL_START and the appropriate computation of SB_CURRENT thereafter will be made in either step 84 or 86. The value of SB_TOTAL will again be computed in step 88. Since the processor has previously computed a value of SB_TOTAL, the computation in step 88 will be the previous value of SB_TOTAL plus the computed value of SB_CURRENT in either step 84 or 86. The thus computed value of SB_TOTAL will be compared to MAX_SB_VALUE in step 90 and appropriately capped in step 92, if necessary. The processor will proceed to return to step 78 and thereafter proceed through steps 96 and 48–54. Assuming that a setback usage request has not been received in step 54, the processor will proceed through steps 54 and 56 and return to step 32, as has been previously discussed.

Referring again to step 32, it is to be appreciated that at some point in time during the successive executions of the logic of FIG. 3, another SETBACK_RECORD flag equal to one may occur. When this happens, SB_SETPOINTOFFSET and SB_STARTTIME and SB_PERIOD will again be read from the memory 24 in step 34. At some point the TIME_OF_DAY will again be equal to SB_STARTTIME. The processor will now enter into a setback mode of operation by setting SB_ACTIVE equal to one in step 58. The processor will proceed through steps 60, 62, 64, 66 and 68, as has been previously described, before encountering step 54. Assuming that a setback usage request has been made and stored in the memory 24, the processor will proceed out of step 54 to step 98 and clear the thus stored setback usage request in memory 24. The processor will proceed to step 100 and implement the setback participation sub-routine of FIG. 4. As has been previously discussed, the TIME_OF_DAY will be read and compared with SB_INITIAL_START before computing the value of SB_CURRENT in either step 84 or 86. The processor will proceed in step 88 to compute the value of SB_TOTAL. The thus computed value of SB_TOTAL will be clamped at MAX_SB_VALUE, if necessary, in step 92 before returning to step 100. The processor will proceed from step 100 to step 102 wherein a message will be sent to the transceiver 12, which will in turn communicate with the energy provider's receiving device. The message will include the value of SB_TOTAL. The processor will next proceed to step 104 and inquire as to whether SB_ACTIVE is equal to zero. It will be remembered that the request for setback usage was encountered during a time in which the setback mode of operation was in effect. SB_ACTIVE would hence still be equal to one prompting the processor to proceed from step 104 to step 106. Referring to step 106, the variable SB_INITIAL_START will be set equal to the currently read time of day from the system clock. This will, essentially, set a new SB_INITIAL_START that is equal to the presently read TIME_OF_DAY. The processor will proceed from step 106 to step 56.

Referring to step 56, it is to be noted that this step may also be encountered out of step 104. The processor will have proceeded out of step 104 to step 56 in the event that the thermostat was no longer in a setback mode of operation, as indicated by SB_ACTIVE being equal to zero. The processor will proceed to inquire in step 56 as to whether an initialization of setback usage request has been received and stored in the memory 24. This particular request message will possibly be transmitted by the energy provider when the energy provider wishes to start the computation of SB_TOTAL all over again from zero. If this message has been received, then the processor will proceed along the yes path to a step 108 and clear the initial setback usage request stored in memory 24. The processor will then proceed to step 110 and set SB_TOTAL equal to zero. The processor will proceed from step 110 through junction B back to step 32. Referring again to step 56, in the event that a request to initialize the setback usage has not been received, the processor will proceed directly to step 32. It is thus to be appreciated that the processor may have sent a message to the energy provider in step 102 without initializing SB_TOTAL if the processor has not received the initialized setback usage request. On the other hand, if the processor has received the initialized setback usage request, then the SB_TOTAL will be set equal to zero in step 110.

Referring again to step 32, inquiry is made as to whether SB_ACTIVE is equal to one. It is to be appreciated that SB_ACTIVE may either be one or zero after having processed a usage request through steps 98–110. Assuming that SB_ACTIVE is still equal to one, then the processor will proceed along the yes path to step 70 and inquire as to whether SB_TIMER equals zero. It will be remembered that SB_TIMER has been continually decrementing towards zero since having been initially set equal to "t" in step 60. This decrementing of the SB_TIMER will occur regardless of whether or not a setback usage request has been processed in steps 98–100. At some point, the SB_TIMER will be decremented to zero when step 70 is encountered. When this occurs, the processor will proceed along the yes path to step 76 and set SB_ACTIVE equal to zero before implementing the computation of setback participation in step 78. Referring to the subroutine for computing setback computation in FIG. 4, the processor will again read the TIME_OF_DAY as well as the values of SB_INITIAL_START and SB_TOTAL. It will be remembered that SB_INITIAL_START will have been set equal to the TIME_OF_DAY occurring when step 106 is executed. This will be a different SB_INITIAL_START than would have been normally carried by the processor as a result of implementing step 58. In other words, SB_INITIAL_START will now be whatever TIME_OF_DAY it was when the setback usage request was processed. The processor will proceed to inquire whether or not the read time of day in step 80 is greater than the value of SB_INITIAL_START in step 82. As has been previously discussed, SB_CURRENT will be computed out of step 82 in either step 84 or 86. SB_TOTAL will now be computed in step 88. Referring to steps 98–110, it will be appreciated that the previous value of SB_TOTAL will either be whatever has been computed previously during previous executions of the logic or SB_TOTAL will have been previously set equal to zero in step 110. In this latter case, SB_TOTAL will be equal to zero in step 110 as a result of a received message from the energy provider to initialize the setback usage out of step 56. It is hence to be appreciated that SB_TOTAL as computed in step 88 will either be a continuing accumulation of previous SB_TOTAL values in conjunction with the SB_CURRENT value or it will be a new SB_TOTAL starting from an SB_TOTAL of zero. It is to be furthermore appreciated that any subsequent computation of SB_TOTAL in step 88 will include any remaining portion of a setback mode of operation that continues in effect. This will occur even if SB_TOTAL is cleared in step 110 as a result of also having received a request to initialize the setback usage.

It is to be appreciated that a preferred embodiment of a program for tracking and reporting setback usage has been disclosed. Alternations and modifications to the thus disclosed program may occur without departing from the scope of the invention. In particular, the processor may, for instance, receive different setpoint offsets for heating and cooling. In this event, the adjustments to the current heating and cooling setpoints would be with respect to the particularly computed offsets for each setpoint rather than the currently disclosed single SB_SETPOINTOFFSET. It is also to be appreciated that the approach to adjusting current heating and cooling setpoints by setpoint offsets need not occur to practice the invention. In this regard, setpoint offsets could be replaced by setpoints communicated by the energy provider. In this latter case, there would be no need for logic implementing adjustments to $T_h$ or $T_c$. It is furthermore to be appreciated that the SB_TIMER may be initially set up differently so as to not be a decrementing timer from a particular time "t". For instance, the timer may be incremented from zero at the initialization of a setback mode would work equally well.

Accordingly, the foregoing description of a preferred by way of example only and the invention is to be limited by the following and equivalents thereto.

What is claimed is:

1. A process executable by a programmed processor within a thermostat for tracking and reporting the participation by the thermostat in requested setbacks of the setpoint control for the thermostat, said process comprising the steps of:

responding to a request to enter into a setback mode of operation whereby at least one setpoint used in a normal mode of operation is changed;

tracking the amount of time that elapses during the setback mode of operation; and responding to a request for the total accumulated time that may have elapsed during any present and past setback modes of operation whereby the total accumulated time is transmitted to the requesting entity.

2. The process of claim 1 wherein said step of responding to a request for the total accumulated time that may have elapsed during any present and past setback modes of operation comprises:

noting a request for the total accumulated time that may have elapsed during any present and past setback modes of operation;

computing the requested total accumulated time by adding the tracked amount of time that has elapsed during any present setback mode of operation to any previously accumulated times that have elapsed during previous setback modes of operation.

3. The process of claim 1 wherein said step of tracking the amount of time that elapses during the setback mode of operation comprises the step of:

monitoring any termination of a requested setback mode of operation;

noting the time that has elapsed in a terminated setback mode of operation; and adding the noted elapsed time in a terminated setback mode of operation to any previously accumulated times that have elapsed during previous setback modes of operation.

4. The process of claim 3 wherein said step of monitoring any termination of a requested setback mode of operation comprises the step of:

monitoring a touch sensitive button on the thermostat so as to note when the touch sensitive button has been depressed thereby indicating that an override of the requested setback of the setpoint has occurred.

5. The process of claim 1 further comprising the step of:

responding to a request to initialize the total accumulated time that may have elapsed during any present and past setback modes of operation whereby the total accumulated time is set to zero.

6. The process of claim 5 further comprising the steps of:

computing any remaining period of time that elapses in the setback mode of operation following the setting of the total accumulated amount of time equal to zero;

computing any further amounts of time that elapse prior to termination of further setback modes of operation; and adding the computed remaining period of time and any further computed amounts of time in further setback modes of operation so as to define a new total accumulated time following the initiation of the previous total accumulated time to zero.

7. A thermostat having the capability to track and report the participation by the thermostat in requested setbacks of the setpoint control for the thermostat, said thermostat comprising:

a memory for storing information;

a processor operative to receive at least one communication requesting that the thermostat enter into a setback mode of operation whereby at least one setpoint used in a normal mode of operation is changed, said processor being operative to store information contained in the communication in said memory, said processor being operative to track the amount of time that elapses during the setback mode of operation, said processor being furthermore operative to respond to any communication requesting total accumulated time that may have elapsed during any present and past setback modes of operation whereby the total accumulated time is transmitted to the entity requesting the total accumulated time.

8. The thermostat of claim 7 wherein said processor is furthermore operative in response to a request for the total accumulated time that may have elapsed during any present and past setback modes of operation, to compute the requested total accumulated time by adding the tracked amount of time that has elapsed during any present setback mode of operation to any previously accumulated times that have elapsed during previous setback modes of operation.

9. The thermostat of claim 7 wherein said processor is furthermore operative when tracking the amount of time that elapses during the setback mode of operation to monitor any termination of a requested setback mode of operation and to note the time that has elapsed in a terminated setback mode of operation and to add the noted elapsed time in a terminated setback mode of operation to any previously accumulated times stored in the memory that have elapsed during previous setback modes of operation.

10. The thermostat of claim 7 wherein said thermostat furthermore comprises at least one touch sensitive operation which is depressed when a setback mode of operation is to be terminated and wherein said processor is operative to store an indication that such touch sensitive button has been depressed in memory as an indication that a requested setback mode of operation is to be terminated.

11. The thermostat of claim 7 wherein said processor is furthermore operative to respond to a communication requesting that the total accumulated time that may have elapsed during any present and past setback modes of operation be cleared whereby the total accumulated time is set to zero.

12. The thermostat of claim 11 wherein said processor is furthermore operative to compute any remaining period of time that elapses in the setback mode of operation occurring when the total accumulated amount of time is set equal to zero and is still furthermore operative to compute any further amounts of time that elapse prior to termination of further setback modes of operation and to add the computed remaining period of time and any further computed amount of time in further setback modes of operation so as to define a new total accumulated amount of time of zero following the initialization of the previous total accumulated time to zero.

* * * * *